July 15, 1969     M. PRATS     3,455,392
THERMOAUGMENTATION OF OIL PRODUCTION FROM SUBTERRANEAN RESERVOIRS
Filed Feb. 28, 1968     3 Sheets-Sheet 3

INVENTOR:
M. PRATS
BY: *Louis J. Bovasso*
HIS ATTORNEY

United States Patent Office 3,455,392
Patented July 15, 1969

3,455,392
THERMOAUGMENTATION OF OIL PRODUCTION FROM SUBTERRANEAN RESERVOIRS
Michael Prats, Houston, Tex., assignor to Shell Oil Company, New York, N.Y., a corporation of Delaware
Filed Feb. 28, 1968, Ser. No. 708,826
Int. Cl. E21b *43/24*
U.S. Cl. 166—303                                   12 Claims

ABSTRACT OF THE DISCLOSURE

A method for recovering oil from gas-permable, subterranean reservoirs by steam soaking a reservoir interval having a permeability conducive to gravity drainage. The interval is penetrated by a borehole which is then cased and a radially-extending, disk-shaped, heat-directing impermeable barrier is formed in the central portion of the interval. Steam is then injected into the interval below the barrier until a steam zone extends beyond and above the rim of the barrier. The well is backflowed and effluent fluid is recovered therefrom.

BACKGROUND OF THE INVENTION

Field of the invention

This invention relates to the recovery of oil from subterranean, oil-bearing reservoirs and, more particularly to a method of injecting steam into a limited zone of an oil-producing reservoir interval having a permeability conducive to gravity drainage and subsequently recovering effluent reservoir fluid through this limited injection zone to enhance the production of oil from the reservoir interval.

Description of the prior art

While the viscosity of various crude oils spans a wide range, many are relatively viscous materials but their viscosity decreases as the temperature of the crude oil is increased. Thus, if sufficient thermal energy is added to even a relatively viscous crude oil, such as those typified by some of the viscous crude oils in California, the addition of heat will convert these crude oils to a more mobile liquid. Because of the reduction in viscosity and increased mobility upon heating, it will be easier to recover these crude oils from the reservoir interval. Even the non-viscous crude oil, comparatively speaking, can be more easily recovered when heated and often in such cases the total quantitative recovery is greatly enhanced by such treatment.

Further, petroleum crude oils are often found in reservoir intervals having relatively small pores, commonly referred to as "tight" sandstones or limestones and in such formations viscous crude oils, and even crude oils much less viscous, are quite immobile in the reservoir interval at normal reservoir interval conditions and, therefore, difficult to recover. In these cases, the addition of thermal energy to the reservoir interval can reduce the viscosity of these crude oils to a point where they flow quite easily through even the limited pore space in such a tight formation.

In prior processes heated fluids, such as steam, have been used to recover crude oils from oil-bearing reservoir intervals in which the permeability is conducive to gravity drainage. This type of process is often referred to as a "steam soak" or a "backflow" thermal recovery and is distinct from the so-called "drives" in which an input well and an output well spaced from the input well are used in a process in which one well is used as an injection well and the second well is used as a recovery well. In a drive process, the object is to drive the crude oil away from the vicinity of the input well and toward the production well; however, in backflow recovery techniques, which are based on thermal stimulation, it is undesirable to drive the oil away from the input well since it will eventually become the recovery well and oil driven away therefrom will have to flow back through the reservoir interval to the well in order to be recovered. Thus, it should be appreciated that there are substantial differences in these two types of recovery processes.

In an application of Closmann, Ser. No. 511,660, filed Dec. 6, 1965, and now U.S. Patent No. 3,358,752, it is suggested to inject heated fluid through an opening into only a relatively thin central portion of an oil-bearing reservoir interval in which the vertical permeability is at least about half the horizontal and the oil is recovered through the same borehole which is used to inject the heated fluid. Fluid within the reservoir interval is then backflowed through the same opening. This process avoids displacing substantial volumes of oil located around the borehole yet adds sufficient thermal energy to the reservoir interval in a manner that materially enhances oil recovery therefrom. In another application of Closmann, Ser. No. 430,613, filed Feb. 5, 1965, now U.S. Patent No. 3,349,849, it is suggested to produce oil from such a formation by backflowing through openings which communicate with the entire reservoir interval. This latter process is applicable to, but not limited to, layered reservoir intervals in which the proportion of flow that will occur along vertical directions is insignificant relative to that which will occur along horizontal directions.

SUMMARY OF THE INVENTION

It is an object of this invention to utilize the gravity segregation of fluids within an oil reservoir interval to maximize the effective drainage radius of the borehole of a well.

It is a further object of this invention to improve the production of oil from an oil reservoir having a permeability conducive to gravity drainage.

In the practice of the instant invention, which is an improved steam soak or thermal backflow process, it is possible to improve the production of oil from oil-bearing reservoir interval in which gravity drainage is significant, i.e., a relatively permeable interval having a ratio of vertical permeability to horizontal permeability conducive to fluid flow in all directions. The reservoir interval is penetrated by a borehole which is then cased. A disk-shaped, impermeable barrier is formed in the central portion of the reservoir interval so that the barrier surrounds the borehole and extends radially a substantial distance along a plane that is substantially horizontal. Fluid communication is then provided between the inside of the borehole and the reservoir interval only in the portion of the reservoir interval below the barrier. Steam is then injected from the borehole through the fluid communication and into the reservoir formation in a volume sufficient to form a steam zone extending to beyond and above the outer rim of the barrier. Fluid in the reservoir interval is then backflowed through the same fluid communication and oil is recovered from the recovered fluid. Of course, during the recovery cycle, the pressures within the borehole must be reduced to pressures below those existing within the reservoir formation in order to cause fluid to flow into the borehole.

The method of this invention can be used in substantially any reservoir having a permeability that is conducive to gravity drainage and containing a crude oil having a viscosity of more than about 100 centipoises, which is materially reduced by increases in temperature. It is especially applicable to reservoir intervals which are no longer capable of natural flow, such as those depleted by primary recovery and oil recovery in these reservoir intervals often referred to as "secondary recovery" or "tertiary recovery."

The method of the invention is applicable to a dipping reservoir having an inclination from about 0° to 60°. Such reservoirs are susceptible to gravity drainage (in respect to the present process) when their permeability is adequate relative to the viscosity of the steam-heated reservoir oil and the ratios of the vertical to horizontal permeability is conducive to flow in all directions. In general, if the vertical permeability is significant, e.g., about one-half that of the horizontal permeability, the ratio is conducive to flow in all directions, since an injected fluid will flow vertically at least about one-half as fast as it will move horizontally. The relative magnitudes of the vertical and horizontal permeabilities of a reservoir can be determined by known methods using correlations of logs and core information and/or by a direct determination of the rates at which fluids move from one level to another along the path between a pair of wells, such as an operational well and a pilot well.

Injecting heated fluids into oil-producing reservoirs is not new and also is not a universal panacea to additional oil recovery. Differences in recovery per unit of heated fluid injected in reservoir intervals having a permeability conducive to gravity flow, using the method of this invention as compared to prior art processes, as for example, those of the two Closmann patents discussed previously, are primarily caused by the impermeable barrier preventing any upflow near the well during the steam injection cycle. This forces the steam zone to expand radially along a central layer within the reservoir interval. The resultant radially extensive steam-swept central layer becomes a relatively permeable, oil-depleted zone having a temperature at which the reservoir oil is a mobile liquid and, in effect, becomes a horizontal extension of the borehole of the well. At the edge of the permeable barrier the inflowing steam is free to move up and rise to the upper portion of the reservoir interval. Where the barrier has a diameter of at least twenty feet, the steam zone has a generally vertically sided annular portion in which the innermost diameter is at least about twenty feet. As compared with prior processes, the area along vertical surfaces that is contacted by a steam zone of a given size is increased by many times. In prior processes the steam flows up around the well so that the innermost generally vertically sided annular portion of the steam zone is the cement sheath around the well. For steam zones of equal volumes in reservoirs of equal vertical thickness, those extended by the present horizontal barriers have effective drainage surface areas exceeding those of the prior processes by factors of several times (e.g. 3.14 x 100 x thickness vs. 3.14 x 4 x thickness).

In the present barrier, the steam zone is preferably located as near as is feasible to the bottom of the reservoir. When the barrier is near the bottom, the gravity drainage area along each side of the annular steam zone that forms beyond the edge of the barrier has a height that nearly equals the thickness of the reservoir.

As discussed in the Closmann Patent No. 3,358,762, supra, the amount of oil thermally mobilized and recovered by restricting the flow of heated fluid into a reservoir interval along generally centralized zones within the middle or central portion of the interval; i.e., preferably, a zone having a thickness from one-fourth to one-third of that of the total reservoir interval, is about twice that obtained by using procedures in which steam is injected over the whole reservoir interval.

During the production cycle of the present invention, the pressure within the borehole is lowered to a pressure less than that in the surrounding portion of the reservoir interval and fluid is backflowed into the well. The heated fluid, such as steam, its condensate and heated oil within the heated fluid zone are drawn toward the low pressure of the well. In the vertical portion of the heated fluid zone, the expansion of the pressurized steam that was not condensed during the injection cycle, and the expansion that is formed by the flashing of hot condensate, increase the rate of the gravity-aided downward drainage of water and oil. Thus, in the horizontal portion of the steam zone, the backflowing steam displaces and/or entrains the water and oil. This portion of the heated fluid zone tends to retain the maximum temperature at which heated fluid is injected, to be depleted of its original oil content, and to serve as a relatively highly permeable conduit which connects the borehole to the bottom of the annular, vertically extensive portion of the heated fluid zone. The large volume of the radially displaced, vertically extensive portion of the heated fluid zone causes a large volume of oil to be drained within a unit time and thus provides a rate of oil production that is high relative to the rate obtainable where the vertically extensive portion of the heated fluid zone is not radially displaced from the well. In the vertical portion of the steam zone, the steam segregates above the oil and condensate. During backflow, the overlying steam expands as an elastic drive fluid that displaces the liquid into the well. In the outlying horizontal rim of the steam zone, the steam expands laterally and tends to displace only steam, rather than the desired oil, toward the borehole.

In the practice of the invention, steam is probably the most readily available heated fluid and it can be low quality steam (i.e., a mixture of steam and water) or high quality steam. However, other low density heated fluids, such as inert gases, can likewise be used but, in general, steam will be the principal one because of the comparatively large quantity of heat available per unit mass as latent heat.

DESCRIPTION OF THE PREFERRED EMBODIMENT

Figure 1:
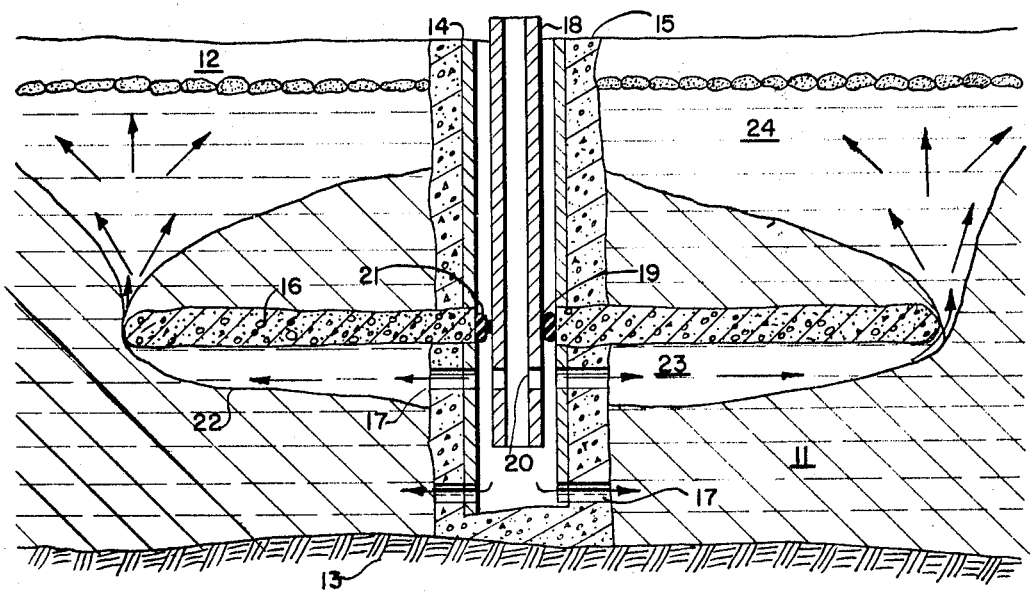
FIGURE 1 is a vertical sectional cross-section of a portion of an earth strata which includes a permeable oil-bearing reservoir interval penetrated by a borehole and shows conditions in the reservoir interval during the injection phase of the invention.
Figure 2:
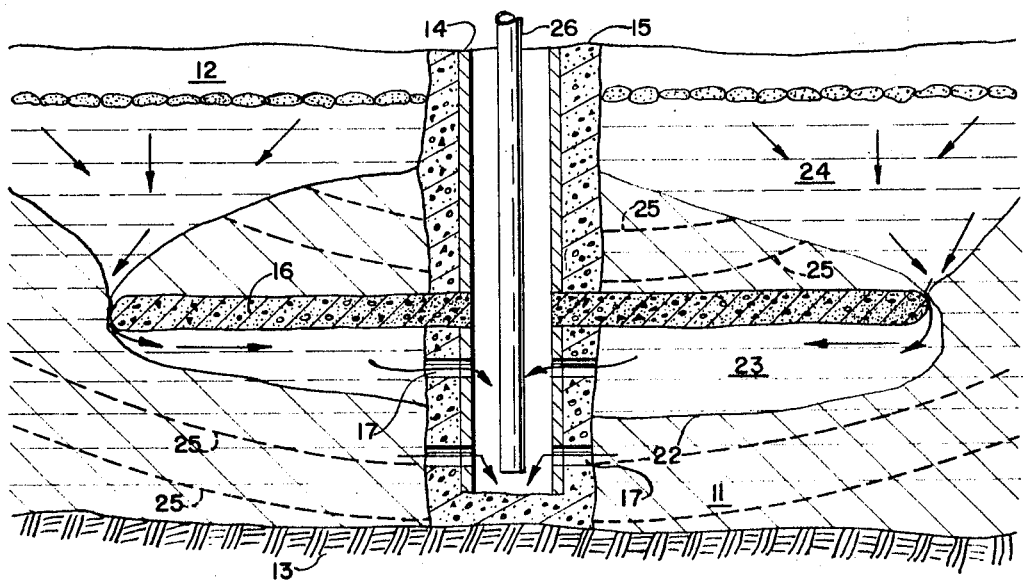
FIGURE 2 is the same cross-sectional view of the lower portion of the borehole shown in FIGURE 1 at a subsequent stage in the process during which backflow of effluent fluid from the reservoir interval into the borehole is occurring.

The conditions illustrated in the drawing are generally the idealized situation which, of course, probably would not be those actually occurring in the reservoir interval, but are illustrative of the general patterns occurring in the reservoir interval. Referring to FIGURES 1 and 2, showing the same cross-section of the reservoir interval in which the present invention is being applied, the same numeral designates identical parts within both figures. FIGURE 1, showing conditions in the reservoir interval during the injection phase of the process, illustrates a permeable oil-bearing reservoir interval 11 sandwiched between an upper impermeable layer 12 and a lower impermeable layer 13. The borehole penetrating reservoir interval 11 is shown with a casing string 14 sealed in the borehole with a sealant 15, such as cement. This arrangement prevents fluid communication between reservoir interval 11 and the inside of casing string 14.

A disk-shaped barrier 16 is preferably located in the lower central portion of the reservoir interval 11. A particularly suitable location for barrier 16 is within the bottom 5 to 25 percent of the reservoir interval 11.

The impermeable barrier 16 can be formed by fracturing and fracture-plugging operations of the types described in Patents 3,237,690 and 3,245,468. This method is particularly suited for use in relatively permeable reservoir intervals in which fractures tend to form along horizontal planes. Thus, a horizontal fracture may be extended through the reservoir interval 11 to a significant radius, e.g., at least about 10 feet, and, preferably, between about 20 to 100 feet. The fracture is then plugged with an impermeable material, such as cement. Such fracture-plugging processes are disclosed in the prior art as exemplified by the aforementioned patents. Barrier 16 is preferably formed in the lower central portion of reservoir inteval 11 so that barrier 16 surrounds the borehole and extends radially a substantial distance along a plane that is substantially horizontal.

This invention is applicable to substantially any reservoir and barrier 16 which may be formed within the unfractured matrix of a reservoir formation, as, for example, by a guided fluid-injection technique such as that described in a Patent No. 2,784,787 to Matthews et al. Thus, barrier 16 may be formed by injecting a fluid that forms an insoluble sealing material under pressure substantially radially into the reservoir interval in the lower central portion with the fluid injection being conducted in the manner described in the patent to Matthews et al. A disk-shaped deposit of material is thus formed which readily hardens to become impervious to fluid. The plug-forming fluid is injected while a non-sealing liquid is injected simultaneously under pressure and substantially radially into at least the reservoir interval traversed by the borehole and in a direction essentially parallel to the disk-shaped deposit. Both injections are carried out under pressures sufficient to maintain the radial flows of the fluid sealing material and non-sealing fluid at substantially equal velocities.

In general, the ratio of the vertical to horizontal permeabilities should be high enough to ensure a significant proportion of fluid flow in all directions. For example, during an injection of fluid at a point within the reservoir interval, the expanding, fluid-filled volume remains generally spherical, due to flows in vertical as well as horizontal directions, rather than becoming disk-shaped, due to flows confined to horizontal directions. It is preferable that the ratio of vertical to horizontal permeabilities be relatively high when the permeability is relatively low and the viscosity of the heated oil is relatively high. Where the permeability is high relative to the viscosity of the oil the ratio can be as low as about 0.1.

Subsequent to formation of barrier 16 and the sealing of casing string 14 in the borehole with sealant 15, perforations 17 are made through the casing string 14 and sealant 15 in the middle or central portion of reservoir interval 11 and below barrier 16 to provide fluid communication between the reservoir interval 11 and the inside of the casing string 14. These perforations can be made with various conventional devices which are readily available, such as a shot device. In a preferred procedure the perforations are arranged to provide fluid communication between the inside of casing string 14 and reservoir interval 11 only in the lower central portion of interval 11 below barrier 16. It is to be specifically noted that this is the only place of fluid communication between the interval 11 and the inside of casing string 14. Also, numerous perforations can be used to provide the fluid communication even though only several are shown. Actually, the casing string 14 could be severed from the lower portion thereof by a jet cutting tool in order to provide the necessary fluid communication if this is desired.

After the borehole has been cased and perforated as described above, the preferred practice is to lower a tubing string 18 through the inside of casing string 14. If the casing is perforated in a layer zone, e.g., in the lower material of a dual completion, the tubing string 18 is preferably equipped with a pair of straddle packers 19 spaced from one another on the downhole end of the tubing string 18. Tubing string 18 is closed at its lower end and has an opening 20 located in the interval between the spaced packers 19. These spaced packers 19 are of the conventional type and have actuatable sealing means 21 circling their periphery. Once tubing string 18 is lowered in casing string 14 so that the packers 19 are on either side of perforations 17, the sealing means 21 are set thus sealing off a chamber between the spaced packers 19. This restricts the fluid communication between the inside of tubing string 18 and reservoir interval 11 to a narrow portion of casing string 14 having the perforations 17.

Tubing string 18 can be insulated to lessen the heat loss to the formation strata above reservoir interval 11 but this is frequently not necessary. An alternative procedure in shallow wells is to inject steam down the annulus of the well and produce oil later through the tubing string 18. Also, the tubing string 18 can contain a downhole pump for pumping the effluent fluid backflowing into the well during the recovery step.

Subsequent to the preparation of the borehole as described above, a heated fluid such as steam is injected into the reservoir interval 11 via tubing string 18 as indicated by the arrows in FIGURE 1. In general, the injection of the steam tends to flow regularly out into the reservoir interval below barrier 16 as indicated in FIGURE 1 expanding to a thickness in the order of 1 to 20 feet. Due to the substantially equal horizontal and vertical permeabilities of the reservoir intervals in which this invention is practiced, a heated fluid zone 22, including a substantially horizontal portion 23 and a substantially vertical portion 24, is formed by the injection of the steam which has a temperature above the natural temperature of the interval 11. This zone 22 tends to migrate horizontally and radially of the borehole below barrier 16 to initially form the horizontal portion 23 of the zone 22. When the steam reaches the ends of barrier 16, the zone 22 migrates vertically upward because of the tendency of this steam to rise. If the reservoir interval is relatively impermeable, it is generally preferred to form and prop open a horizontal fracture located below the impermeable barrier 16. This insures a suitable rate of flow of the injected steam and subsequent backflowed fluid. The thickness of the horizontal portion 23 of zone 22 is controlled to some extent by the vertical spacing of the perforations 17 through casing 14 and sealant 15. With the perforations in a single plane, thinner steam zones tend to be formed.

After the injection of the heated fluid has been completed into the zone 22 of reservoir interval 11, the well is usually shut-in under pressure to retain the heated fluid within the interval 11 for a "soak" period. As is well known to those skilled in the art, the duration of both the injection and of the "soak" periods can be widely varied depending upon the reservoir conditions, such as temperature of the heated fluid and thickness of the reservoir interval 11, to name a few. The purpose of the soak period is to allow the thermal energy in the heated fluid to be transferred to zone 22 and then to other portions of interval 11 surrounding zone 22. In some cases, the soak period may be of negligible duration. Of course, as the interval 11 is heated, the crude oil therein is warmed and becomes less viscous which usually enhances the rate and amount of oil that will be subsequently produced from the interval 11 by backflow for the injection of a given volume of heated fluid.

Once the soak period has been completed and at least a portion of the thermal energy contained in the heated fluid has been transferred to the non-injected portions of reservoir interval 11 as indicated by the temperature gradient lines 25 of FIGURE 2, the oil in these areas is less viscous than it was in its natural state. Generally, at this point, oil can be produced from the reservoir interval 11 merely by releasing the pressures used to retain the heated fluid in the interval 11 during the soak period, or, if desired, by reducing these pressures to a value at least at low as the original pore pressure of the interval 11 by pumping systems (not shown) used within casing string 14.

As the pressures in the formation are reduced via the borehole, a decreasing pressure gradient in the direction of the borehole develops and oil from zone 22 and from the portions of the reservoir interval 11 surrounding zone 22 as discussed above tends to flow toward the borehole as indicated by the arrows in FIGURE 2 and into casing string 14 through perforations 17. During this portion of the backflow process, it may be desirable to replace the steam injection tubing string 18 with a production tubing string 26 and associated pumping equipment (not shown) to recover the oil draining into the casing string 14. Tubing string 26 may or may not be required depending upon the pressures within the reservoir interval 11 and other factors which are within the knowledge of those skilled in the art; however, its use allows the bottom of the borehole to be used as a sump for collecting the oil.

Figure 3:
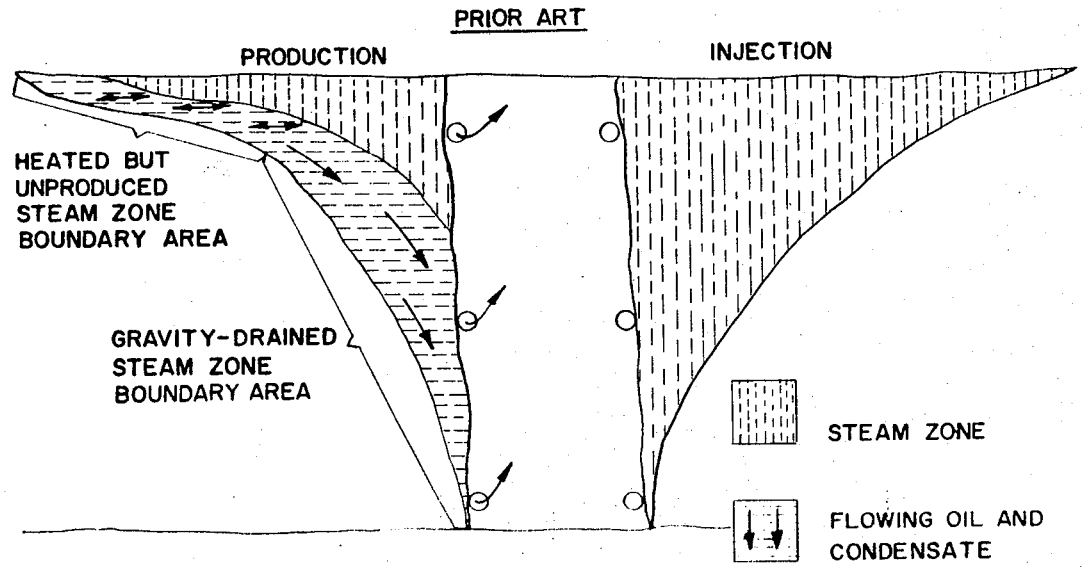
FIGURE 3 is a vertical cross-sectional view of a prior art process.
Figure 4:
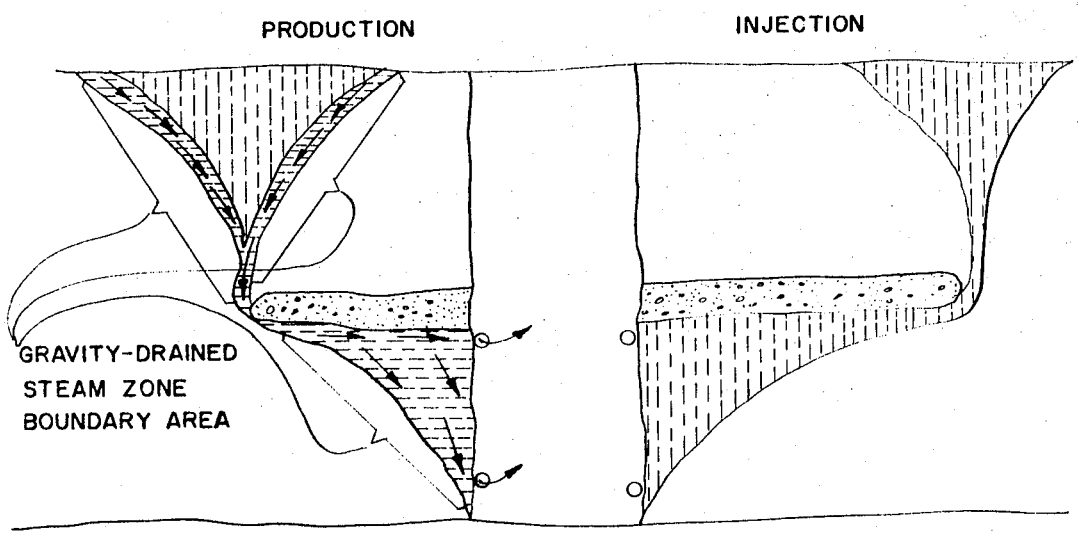
FIGURE 4 is a vertical cross-sectional view similar to that of FIGURE 2 and further explanatory thereto.

The foregoing steps, including the injection of a heated fluid, retaining the heated fluid within the interval 11, backflowing and subsequently recovering effluent fluid may be repeated so as to increase the rate of effluent fluid entering casing 14. The above process is further illustrated in FIGURE 4 which is to be compared with the prior art process of FIGURE 3. The legends thereon for both steam zone configurations would appear to be self-explanatory in view of the foregoing and, therefore, further comment is deemed unnecessary.

It is important when carrying out the invention that the heated fluid be injected through a limited zone in a central portion of the reservoir interval 11. By limited zone, it is intended that the perforations for injecting the heated fluid be located above the bottom of reservoir 11 and preferably below the middle of interval 11. Of course, the perforations 17 can be spread out over this central interval but below barrier 16. Normally, the interval into which steam is injected will be more than about 10 feet thick and a suitable number of perforations through the casing 14 at multiple levels will be required to provide the necessary fluid communication. However, in thin reservoir formations, it may be desirable only to perforate at a single level such as slightly below the barrier 16 which is preferably located in the lower middle or central portion of reservoir interval 11.

The rate at which oil is produced by the teachings of this invention is increased by an amount proportional to the increase in the effective amount of gravity-drained surface area. The increased rate of production increases the amount of oil that is produced before the maximum oil cut becomes uneconomically low.

Some examples of heated fluids that may be used in place of steam are methane, ethane, propane, nitrogen and other inert, non-oxidizing gases or low density liquids. Of course, the basic selection of the heated fluid to be used in the process revolves about the economics of such injection and, for the most part, steam has the most amount of heat available per unit mass of injection fluid.

In practicing this invention, the heated fluid is injected at a pressure which exceeds the reservoir pore pressure in order that the heated fluid will move in through the reservoir interval 11 from casing string 14. Higher than overburden pressures can result in dangerous blowouts and should be used with caution, especially in shallow reservoirs having less than 500 feet of overburden. In general, the process is preferably carried out below the overburden or fracture-propping pressure of the reservoir interval.

In general, because of the cross-flow which occurs in the instant invention, thick reservoirs are preferred, i.e., those having a thickness of 120 feet or greater. Of course, in the thicker reservoirs, the heated fluid may be injected at several spaced locations below the barrier.

Figure 5:
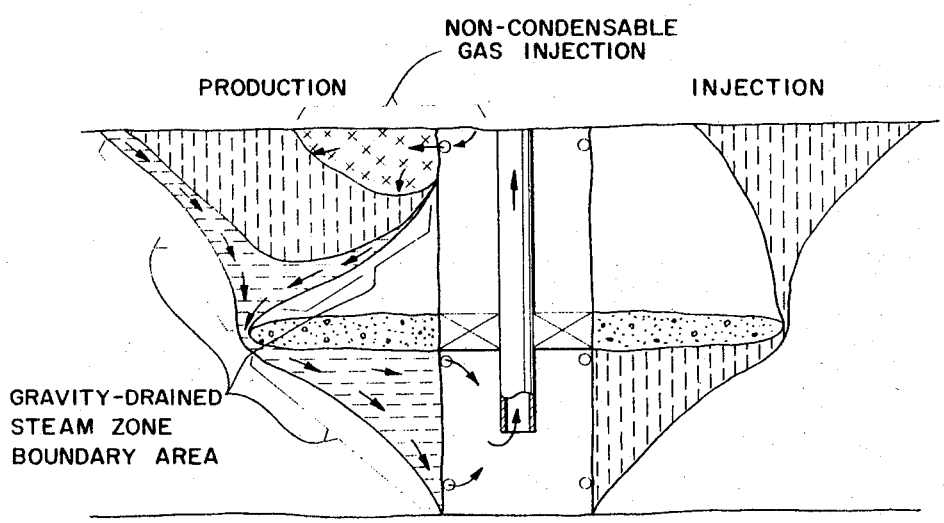
FIGURE 5 is a vertical cross-sectional view of a modified process in accordance with the invention.

The present process may be significantly improved, in respect to relatively tight reservoirs, by an injection of noncondensable gas into a zone in which the elastic expansion of the gas tends to enhance the liquid flow rate along the gravity-drained boundry areas of the heated zone as shown in FIGURE 5. For example, in reservoirs in which the rate of gravity drainage may limit the rate of production, it may be desirable to inject noncondensable gas into a region in which its elastic expansion, during the production cycle, provides a pressure gradient that supplements the gradient due to gravity. Such a noncondensable gas can be injected through the openings through which the heated fluid is injected (a) as a slug preceding the heated fluid, as described in my prior Patent 3,333,637 and/or (b) as fluid produced in situ along with the heated fluid, where the heated fluid is produced by an in-situ combustion in the manner described in my copending patent application Ser. No. 645,030 filed June 9, 1967, now U.S. Patent No. 3,409,083. Alternatively, or additionally, such a noncondensable gas can be injected through an opening located above the disk-shaped impermeable barrier, before and/or during the production cycle.

Certain modifications of the invention will become apparent to those skilled in the art and the illustrative details disclosed are not to be construed as imposing unnecessary limitations on the invention.

I claim as my invention:

1. A method for recovering oil from gas-permeable, substerranean reservoirs by injecting hot low density fluid and backflowing fluid from a reservoir interval having a ratio of vertical to horizontal permeability conducive to fluid flow in all directions, said method comprising the steps of:

penetrating such a reservoir interval with a borehole;
inserting a casting string into said reservoir interval of said bore hole and sealing the casing string therein to prevent fluid communication between the inside of said casing string and said reservoir interval;
forming a disk-shaped, heat-directing, impermeable barrier between the vertical extremities of the reservoir interval so that the barrier surrounds the borehole and extends radially a substantial distance along a substantially horizontal plane;
providing fluid communication between the inside of said casing string and said reservoir interval only below said barrier;
injecting via said casing string heated fluid having a temperature above the natural temperature of the reservoir interval and a density less than the fluids in the reservoir interval, through said fluid communication established below said barrier in a volume sufficent to form a heated zone extending beyond and above the outer rim of said barrier;
retaining said heated fluid in said reservoir interval for a period of time sufficient for heat of said heated fluid to be transferred to said reservoir interval;
backflowing fluid from said reservoir interval through said fluid communication to recover effluent fluid from said reservoir interval; and
recovering effluent fluid entering said casing string during the step of backflowing.

2. The method of claim 1 wherein the step of forming a disk-shaped impermeable barrier includes forming said barrier in the lower central portion of said reservoir interval.

3. The method of claim 2 wherein the step of forming said barrier includes fracturing the reservoir interval in said lower central portion substantially horizontally and radially of said bore hole; and plugging said fractured reservoir interval.

4. The method of claim 2 wherein the step of forming said barrier includes the steps of:

injecting fluid that forms an insoluble sealing material under pressure substantially radially into the reservoir interval in said lower central portion to form a disk-shaped deposit of material which hardens to become impervious to fluid;

simultaneously injecting a non-sealing liquid under pressure substantially radially into at least said reservoir interval traversed by said borehole and in a direction essentially parallel to said disk-shaped deposit; and both the injection of sealing material and non-sealing liquid being carried out at pressures sufficient to maintain the radial flows of the fluid sealing material and non-sealing fluid at substantially equal velocities.

5. The method of claim 1 wherein the step of retaining said heated fluid in said reservoir interval includes retaining said heated fluid under a sufficient pressure thereon until the heated fluid forms an annular heated, substantially laterally displaced heated zone surrounding said borehole, which zone increases in volume in a vertical direction away from and above the outer limits of said barrier.

6. The method of claim 1 wherein the step of forming said disk-shaped impermeable barrier includes forming a barrier having a radius of at least about twenty feet.

7. The method of claim 1 wherein the step of retaining the heated fluid in the reservoir interval includes retaining the heated fluid therein for a period sufficient to transfer some of the heat of the heated fluid by maintaining a sufficient pressure thereon and the backflowing of the reservoir interval is accomplished by reducing the retained pressures below that in the surrounding reservoir interval.

8. The method of claim 1 wherein the step of providing fluid communication includes the step of forming and propping open a horizontal fracture below the impermeable barrier when said reservoir interval is relatively impermeable prior to injecting said heated fluid.

9. The method of claim 1 wherein the steps of injecting the heated fluid, retaining the heated fluid in the reservoir interval, backflowing the reservoir interval and recovering effluent fluid are repeated.

10. The method of claim 1 wherein the step of forming a disk-shaped impermeable barrier includes forming said barrier in the lower half of the reservoir interval.

11. The method of claim 1 wherein the step of providing fluid communication below said barrier includes providing said communication only intermediate the vertical extremities of said reservoir interval.

12. The method of claim 1 further including the step of injecting a non-condensable gas into said heated zone to enhance the liquid flow rate along the gravity-drained boundary areas of said heated zone.

References Cited

UNITED STATES PATENTS

| 2,784,787 | 3/1957 | Matthews et al. | 166—42 X |
| 3,180,414 | 4/1957 | Parker | 166—40 X |
| 3,259,186 | 7/1966 | Dietz | 166—40 X |
| 3,333,637 | 8/1967 | Prats | 166—40 |
| 3,349,849 | 10/1967 | Closmann | 166—40 |
| 3,354,958 | 11/1967 | Parker | 166—40 |
| 3,358,762 | 12/1967 | Closmann | 166—40 |
| 3,361,201 | 1/1968 | Howard | 166—42 X |
| 3,409,083 | 11/1968 | Prats | 166—40 |

STEPHEN J. NOVOSAD, Primary Examiner